Patented Dec. 23, 1952

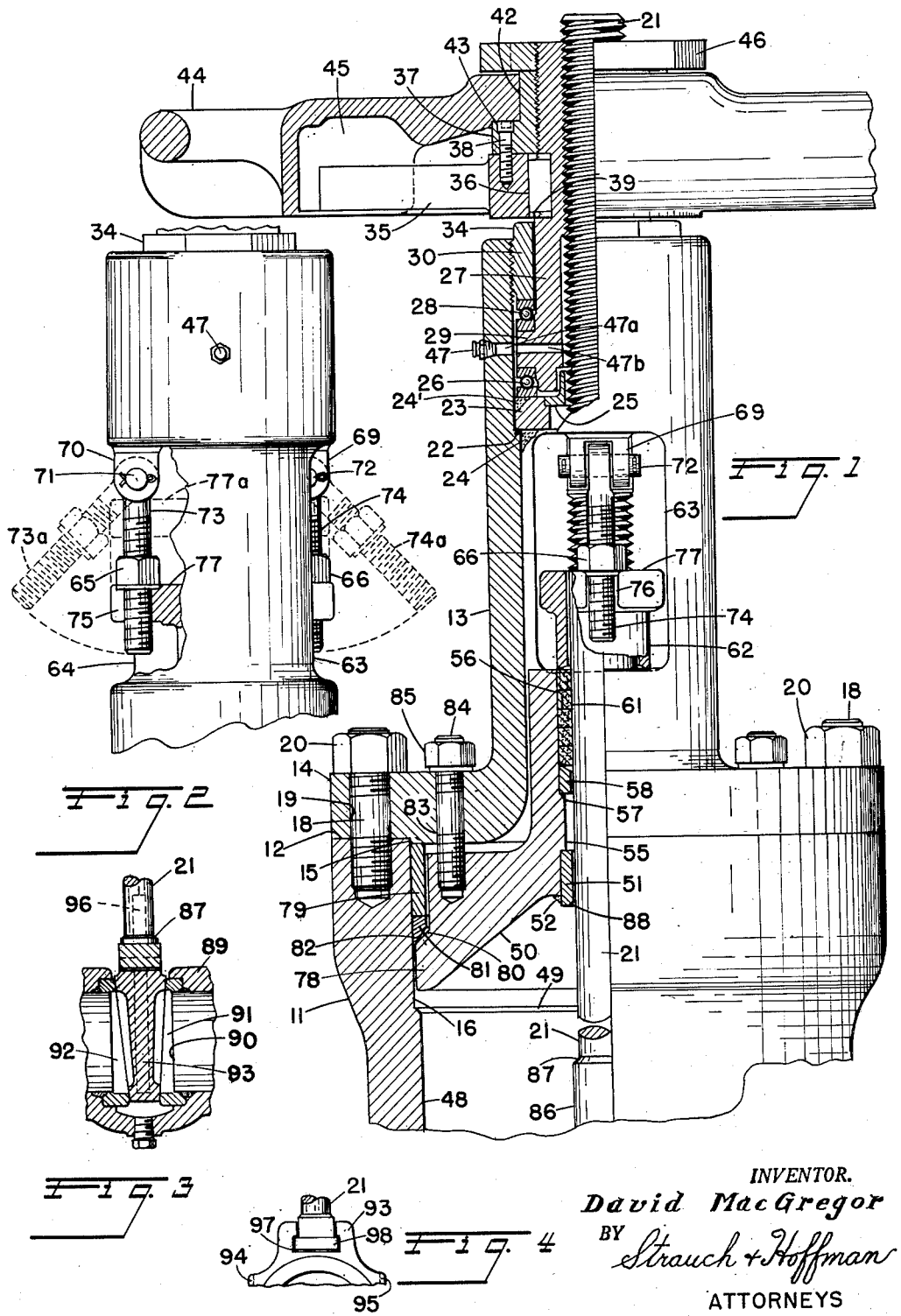

2,622,763

UNITED STATES PATENT OFFICE 2,622,763

VALVE CONSTRUCTION

David MacGregor, Munster, Ind., assignor to Edward Valves Incorporated, East Chicago, Ind., a corporation of Indiana Application October 8, 1946, Serial No. 702,009

5 Claims. (Cl. 220—46)

1

This invention relates to improved construction in high pressure fluid control valves, and particularly to the means used for sealing the valve against leakage where the valve bonnet-yoke connection exits from the valve body and for guiding the valve stem.

Valves for the control of high pressure and high temperature fluid such as steam are frequently of large size and corresponding weight. Because of the variation of the coefficients of expansion of the metal in the valve structure, some parts of which are not simultaneously heated to the same temperature, it is difficult to seal them against leaks around the body-bonnet-yoke connection. Another factor that affects the construction of these valves is that they must occasionally be disassembled for repair purposes. My improved valve is easily disassembled and yet is completely and effectively sealed against leakage of the fluid or the loss of pressure through the sliding connections which permit the operation of the valve by means of exterior devices such as hand wheels or the like. The construction in this invention incorporates some of the improvements disclosed in my application Serial No. 662,341 filed April 15, 1946 for "Valve Construction."

As in the structure of the valve in the aforesaid application the structure of this invention is such that there is no opportunity for misalignment of the valve stem with respect to the valve stem guide yoke and the body of the valve because the yoke guiding the upper end of the valve stem is accurately aligned and securely fastened with respect to the valve body, with a minimum of disturbance due to the floating action of the sealed parts under operating pressure and temperature variations.

It is therefore the primary object of my invention to provide a new and improved valve guide and sealing means for a valve adapted to control high pressure fluids.

It is another object of my invention to provide a novel and improved assembly between a valve body, the yoke and guide for the valve stem, and the valve bonnet in a high pressure valve construction.

Another important object is the provision of a novel and improved construction for supporting and guiding the valve stem and sealing it with respect to the valve body.

Another object is the provision of a novel construction for the support, guiding, and sealing of a valve stem with respect to a valve body in such a manner that the entire assembly may be quickly taken apart for adjustment or repairs to the valve or associated parts and reassembled quickly and in correct alignment.

Other objects will become apparent as the description proceeds in connection with the accompanying drawings, wherein:

Figure 1 is a side elevation, partly in section, of an illustrated embodiment of my invention.

Figure 2 is a side elevation, partly in section, of a portion of the structure shown in Figure 1, as viewed from the left of Figure 1.

Figure 3 is a partial sectional view showing the valve wedge or gate which is raised or lowered to open or close the valve.

Figure 4 is a partial front elevation of the gate or wedge shown in Figure 3.

In Figure 1 only a portion of the upper part of the valve body 11 is shown because the details of the other parts of the body do not form any part of this invention. The valve may be of the angle type shown in my aforesaid application and in my application Serial No. 662,340 filed April 15, 1946 for "Valve Construction," or it may be a globe type valve and it might be of the non-return type valve shown in those two applications, the gate type shown in Figures 3 and 4 being for illustrative purposes only.

The upper portion 11 of the valve body, as is common in valves of this construction, is essentially a hollow cylinder. At its upper end the walls are thickened as shown in Figure 1, and the end thereof is machined to a planar surface indicated at 12. A hollow cylindrical yoke 13 has a radial flange 14 seated upon the planar surface 12 so that the yoke extends in axial alignment with the cylindrical portion 11 of the valve body, the radial flange 14 having a peripheral recess on its lower surface terminating in a shoulder 15 which fits within the slightly enlarged machined bore 16 in the upper portion of the valve body so as to properly locate the yoke 13 in coaxial alignment with the valve body. Vertically extending studs 18 are threaded into the top of the valve body and pass through bores 19 in the radial flange 14. The number of these studs will depend upon the size of the valve and flange 14 and upon the pressure to which the valve will be subjected, as will be understood. Nuts 20 on the studs 18 clamp the flange 14 and the yoke to the top of planar surface 12 of the valve body. The valve stem 21 extends through the cylindrical portion 11 of the valve body and through the yoke 13 as shown. Whether this stem 21 is rotated to open the valve or moved in an axial direction to open the valve is immaterial to this invention. In the embodiment illustrated, however, the valve stem 21 is shifted axially and upwardly to open the valve and is shifted axially in the other direction to close the valve, there being means to prevent its rotation as will be described.

At a point spaced from the upper end of the yoke is an internal shoulder 22 upon which is seated a ring 23, welded in place as indicated at 24 and 24'. A collar 25 which is affixed to the ring 23 in any suitable manner closes the rest of the gap between the valve stem 21 and the inner wall of the yoke. The annular ring 23 forms a support for the lower race of a ball bearing 26. A yoke bushing 27 is journalled by the bearing 26 and a spaced bearing 28, the bearings 26 and 28 being clamped against an annular flange 29 on the bushing by means of a ring 30 which is threaded into the upper end of the yoke and tightened by means of a suitable tool engaging its external head 34. The upper end of the valve stem 21 has a threaded engagement with the yoke bushing 27 so that rotation of the bushing will raise or lower the valve stem within the valve body.

The yoke bushing 27 is rotated by means of an impactor type hand wheel. The hand wheel comprises a pair of diametrically opposed cross-arms 35 which are fitted over the yoke bushing 27 and fixed against rotation with respect to the yoke bushing by means of a key 36. A hand wheel bushing 37 is threaded onto the outer and upper end of the yoke bushing and is secured to the cross-arm 35 by means of screws 38. The upper end of the yoke bushing 27 is slightly reduced to provide an exterior shoulder 39 against which the cross-arm 35 is clamped by the bushing 37. The bushing 37 has a cylindrical surface 42 and a radial surface 43 for journalling and supporting a hand wheel 44. On its under surface the hand wheel has a pair of diametrically opposed lugs one of which is shown at 45. Thus the hand wheel may be rotated freely through substantially a 180° arc until the lugs 45 engage the diametrically disposed parts of cross-arm 35, whereupon further rotation of the hand wheel results in rotation of the cross-arm and the yoke bushing 27 which is keyed thereto. Because of the fact that the hand wheel may be spun through half a revolution before it engages the cross-arm it may be used to jar the cross-arm in order to impart a larger starting force to the valve stem 21 than could ordinarily be applied by the application of a steady force to the wheel or to the cross-arm 35. A nut 46 is threaded onto the top of the yoke bushing 27 and retains the handwheel 44 on the bushing 37. The structure of the impactor type hand wheel and assembly described above does not form any part of this invention, since it is of the type shown in Patent No. 1,990,197 granted February 5, 1935, to Walter W. Mohr. Lubricant to the bearings and threaded portion of the valve stem is supplied through a fitting 47 and bores 47a and 47b.

At the upper end of the cylindrical portion of the valve body 11 the cylindrical bore 16 is of slightly larger diameter than the rest of the bore indicated at 48, there being an inclined shoulder 49 at the juncture of these two bores. A valve bonnet 50 is received within the larger bore 16 wherein it has a sliding and relatively loose fit. The shoulder 49 prevents the bonnet 50 from sliding down into the valve body during assembly or disassembly when it is not fastened in the normal manner. The bonnet has a central passageway for the valve stem 21, there being a bearing bushing 51 suitably fixed in place as by a weld 52, providing a guide for the valve stem where it slides through the bonnet. The bearing 51 is preferably of a hard surfaced stainless steel alloy having a relatively low coefficient of friction with the surface of the valve stem 21 and may be welded as shown or may be screw threaded into place. Depending upon the size of the valve, the clearance between the bearing 51 and the stem 21 is from .007 to .030 inch.

The central bore through the valve bonnet is slightly reduced as indicated at 55 and enlarged as at 56 to provide an internal shoulder 57 upon which is seated a ring 58 which has a sliding fit with the valve stem. A stack of packing rings 61 is received in the enlarged bore 56 where they are compressed against the ring 58 and the valve stem 21 by a packing gland 62. The cylindrical yoke 13 has a pair of diametrically opposed rectangular openings 63 and 64 giving access to the packing gland nuts 65 and 66 which force the packing gland downward to compress the rings 61. One of the novel features of this invention is the arrangement by which the gland 62 may be raised and supported in raised position while packing new or additional rings 61 into the bore 56. The pairs of lugs 69 and 70 are attached as by welding, to the valve yoke 13 adjacent the top of the openings 63 and 64 respectively and have aligned spaced apertures receiving pins 71 and 72 respectively. An eye bolt 73 is journalled upon pin 71 and an eye-bolt 74 is journalled upon pin 72. The eye bolts normally hang vertically downwardly, passing through diametrically disposed slots 75 and 76 of the flange 77 forming the top of the gland 62. As the nuts 65 and 66 are rotated so as to move downwardly upon the eye bolts 73 and 74, they force the gland 62 downwardly against the packing rings 61 to compress them into the bore 56. When the packing rings 61 have to be replaced, or when it is necessary to add some of these rings, the nuts 65 and 66 are loosened so that the eye bolts may be swung open to the dotted line positions indicated at 73a and 74a in Figure 2. While these bolts are swung open in this manner the gland 62 is raised as high as possible and the bolts 73 and 74 are returned to their vertical position but with the nuts 65 and 66 underneath the flange 77 of the gland. The gland is thus held in a raised position and out of the way of the worker who is changing or inserting more packing rings. The gland 62 may be further elevated by raising the nuts, so that its flange 77 is supported in the position indicated at 77a in Figure 2.

The lower end of the bonnet 50 is enlarged by a flange 78 to restrain the bonnet against upward movement past the gasket retainer 79. An inclined wall 80 joins the outer wall of flange 78 to that portion of the bonnet which is received within the gasket retainer 79. A relatively soft sealing gasket 81 which may be of relatively pure soft iron, asbestos or the like, depending on the service for which the valve is used, is located between the retainer 79 and the inclined wall 80 on the bonnet. The gasket 81 has a hollow cylindrical portion, the bottom wall 82 of which inclines downwardly and outwardly. The bottom inclined wall 82 of the gasket makes a more acute angle with the vertical than does the inclined wall 80 of the bonnet. In the example shown, the walls 80 and 82 are at an angle of approximately 1° with respect to each other, this angle being exaggerated in the drawing. The angle of wall 80 with respect to the vertical is approximately 45°. The bonnet 50 has a sliding fit within the gasket retainer 79 and the flange 78 is smaller in diameter than the interior bore 16 so that there is a slight gap between the bore and the flange 78. It is thus apparent that upward movement of the bonnet simply will cause the gasket 81 to be wedged outwardly against the bore 16 and the thin bottom pointed end of the gasket will be squeezed between the bore 16 and the juncture of the cylindrical wall of flange 78 and the inclined wall 80. The radial flange 14 on the yoke 13 is provided with an annular series of holes 83 through which pass the studs 84 which are threaded into the top of the bonnet as shown. When the nuts 85 are screwed onto the studs the bonnet is lifted and the gasket 81 is wedged between the retainer 79, the inclined wall 80 of the bonnet, and the bore 16, because of the fact that the gasket retainer 79 is held against the gasket by the bottom surface on the radial flange 14 while the bonnet is forcefully lifted under the action of the nuts 85. The retainer 79 fits into the bore 16 sufficiently loosely that it may be readily removed when the yoke 13 is removed from the body 11. The construction of this feature is somewhat similar to that disclosed in my aforesaid application Serial No. 662,341 but differs therefrom by the fact that the gasket retainer is not threadedly engaged with the valve body as in that disclosure. The above instant construction permits easier removal of the valve bonnet by merely lifting out the retainer 79. The flange 49 prevents the bonnet 50 from dropping down into the valve body when the nuts 85 are removed from the studs.

The valve stem 21 is enlarged at its lower portion as shown at 86 there being an inclined shoulder 87 which when the valve is in its fully raised position, seats against the inclined surface 88 on the bearing bushing to thereby seal the valve stem against the seat and prevent the transmission of pressure through the central bore in the bonnet.

In the illustrated example, the invention is shown applied to a gate type valve. In such type valves a long lift is required, and in order that the length of the cylindrical portion 11 of the valve body be as short as possible and still obtain the required lift, the underside of the bonnet 50 is recessed as shown. Only one bearing bushing 51 is used instead of the two spaced bushings shown and described in my aforesaid application Serial No. 662,341, but this bushing is still substantially in the plane of the sealing area of gasket 81 so as to minimize the effect of any twisting of the bonnet 50 as the gasket 81 is forced to yield by the movement of the bonnet under the influence of the fluid pressure in the valve.

Figures 3 and 4 show portions of the structure of the gate which is raised and lowered by the valve stem 21.

Another portion of the valve body 11 through which the fluid flows when the valve is open is indicated at 89, and is primarily a conduit. The wall thereof is removed for a large portion of its circumference, leaving an annular opening 90. Seats 91 and 92 of hardened or surface hardened material are welded in place to form oppositely sloping surfaces which receive between them a gate or wedge 93 the opposite faces of which slope towards each other and have mating engagement with the opposite seats 91 and 92 when the valve is closed, as it is when in the position shown in Figure 3. To open the valve, the gate 93 is raised vertically upwardly from the position shown in Figure 3.

The opposite edges of the gate 93 have vertical slots 94 and 95 which engage mating vertical ribs 96 on the interior of the valve body so that the gate is guided in its vertical movements and is prevented from rotating. At its upper end, the gate is provided with a T-slot 97. The lower end of the valve stem 21 below the shoulder 87 is enlarged and has a T-head 98 which is retained in the T-slot 97. The mating T-slot 97 and T-head 98 prevent the stem 21 from rotating, and attach the gate 93 thereto for vertical movement with the valve stem. Other conventional means for preventing rotation of the valve stem, such as a stem guide collar affixed to the stem and passing through a vertical slot in the yoke 13, as disclosed in my aforesaid application Serial No. 662,341, may be used if desired, the means for preventing such rotation not forming a part of this invention.

When the valve is first assembled the nuts 85 on the studs 84 are lightly tightened to cause a sealing engagement of the pointed lower portion of the gasket 81 with the wall of the bore 16 and the corner formed by the inclined wall 80 and the cylindrical wall of the flange 78. As the valve is opened and the operating pressure of the fluid acts against the underside of the bonnet 50, the bonnet moves upwardly and further compresses the gasket 81 to form a pressure seal. This will cause the nuts 85 to be raised slightly and out of engagement with the top surface of flange 14. They should now be lightly tightened again, so that the gasket 81 will remain compressed if the pressure beneath the bonnet is reduced.

The sealing and guide means of the valve structure described herein is fully effective in providing a fluid seal for the purpose intended and yet can be readily disassembled for adjustment, repair, or replacement of parts when necessary. As in my aforesaid application Serial No. 662,341 the bonnet does not support the yoke or operating parts nor absorb any of the impact force required to open or close the valve. Any tilting of the bonnet as the gasket is forced to yield under internal fluid pressure in the valve body will have a minimum effect upon the free movement of the valve stem through the bonnet because of the fact that the bearing bushing 51 is substantially in the same plane as the gasket. A large part of the stresses in the valve body 11 are adjacent the gasket 81 and below the yoke retaining studs but still within the thickened wall section in that region, thus preventing distortion of the valve body under the stresses imposed by the fluid pressure and sealing forces. Realignment and reassembly of the entire structure is simplified by reason of the aligning shoulders and relatively loosely fitting parts and the external location of the seal tightening nuts 85; and repacking of the rings 61 is facilitated by the swinging eye-bolts which retain the gland in raised position. These swinging bolts provide an additional advantage not previously mentioned, which is that the nuts 65 and 66 can be loosened, the bolts swung outwardly, and then downwardly again with the nuts under the flange 77, whereby they can be rotated so as to raise the gland 62 up out of the packing.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Valve structure comprising a tubular body portion terminating at its upper end in a flat annular flange and a valve stem extending through an open end thereof, a bonnet between the body wall and valve stem, a sealing gasket between said body wall and bonnet, a yoke having a base flange, means extending through said base flange rigidly securing said yoke to said body wall, retainer means loosely interposed between said gasket and the yoke flange, means extending loosely through said yoke flange to axially adjust the said bonnet relative to the yoke flange and cause said retainer means to compress said gasket, a sealing pack between the valve stem and bonnet, and additional means including means mounted on said yoke above said pack for compressing said pack while maintaining a relatively stationary coaxial relation of said bonnet and valve body portion.

2. Valve structure comprising a body having a tubular wall portion having a smooth cylindrical surface terminating at its upper end in a flat annular flange, means for closing and sealing the open end of said body comprising a bonnet axially movable within said body, a yoke terminating at its lower end in a radially outwardly extending annular flange adapted to seat on said flange on said wall portion, a plurality of studs extending through one of said flanges and non-rotatably securing said yoke to said body, compressible sealing means interposed between said wall and said bonnet and having a part contacting said yoke flange, and a plurality of adjustable means including studs mounted in said bonnet and extending loosely through said yoke flange adjacent said sealing means and operable to axially move said bonnet upwardly relative to said flange and compress said sealing means.

3. In a valve structure, a hollow body adapted to be subjected to high pressure fluid, an annular bonnet slidably mounted in said body, said bonnet having an inner bore and an outer annular shoulder, a valve stem in said bore, a sealing gasket between said bonnet and said body and seated against said annular shoulder on said bonnet, a yoke having a base flange rigidly secured to said body, means to prevent movement of said gasket toward said yoke flange, a sealing pack between said bonnet and said valve stem, an internal seat within said bonnet engaging the lower end of said pack, means independent of said bonnet supported on said yoke and operable to move the pack axially toward said body and to prevent movement of said pack away from said body, whereby when said bonnet is forced toward said yoke under fluid pressure both said sealing gasket and said sealing pack will be compressed, and means to move the bonnet toward said yoke.

4. In a valve structure, a hollow body adapted to be subjected to high pressure fluid, an annular bonnet slidably mounted in said body, said bonnet having an inner bore and an outer annular shoulder, a valve stem in said bore, a sealing gasket between said bonnet and said body and seated against said annular shoulder on said bonnet, a yoke having a base flange rigidly secured to said body, means to prevent movement of said gasket toward said yoke flange, a sealing pack between said bonnet and said valve stem, an internal seat within said bonnet engaging the lower end of said pack, means independent of said bonnet supported on said yoke and operable to move the pack axially toward said body and to prevent movement of said pack away from said body, whereby when said bonnet is forced toward said yoke under fluid pressure both said sealing gasket and said sealing pack will be compressed, and adjustable means operable to axially move said bonnet toward said yoke and to limit movement of said bonnet away from said yoke.

5. A valve structure according to claim 4 wherein said adjustable means includes studs secured on said bonnet extending loosely through said yoke flange.

DAVID MacGREGOR.

REFERENCES CITED

The following references are of record in the file of this patent:

UNITED STATES PATENTS

| Number | Name | Date |
|---|---|---|
| 1,903,028 | Carlson | Mar. 28, 1933 |
| 2,305,590 | Marburg | Dec. 22, 1942 |
| 2,321,597 | Hobbs | June 15, 1943 |
| 2,363,526 | Hobbs | Nov. 28, 1944 |
| 2,373,020 | Doster | Apr. 3, 1945 |
| 2,385,754 | Baker | Sept. 25, 1945 |
| 2,424,449 | Gasche | July 22, 1947 |
| 2,428,963 | Fennema | Oct. 14, 1947 |